United States Patent [19]

Conner, Jr.

[11] 4,270,718
[45] Jun. 2, 1981

[54] FOUR-POINT SUSPENSIONS

[75] Inventor: William R. Conner, Jr., Shelbyville, Tenn.

[73] Assignee: Kellwood Company, St Louis, Mo.

[21] Appl. No.: 12,281

[22] Filed: Feb. 15, 1979

[51] Int. Cl.³ .................................... F16M 11/24
[52] U.S. Cl. ................................ 248/188.3; 248/649
[58] Field of Search ............... 248/188.3, 188.2, 649; 280/6 R, 6 H; 180/41

[56] References Cited

U.S. PATENT DOCUMENTS

| | | | |
|---|---|---|---|
| 1,385,206 | 7/1921 | Dimond | 280/6 R |
| 1,711,629 | 5/1929 | Wright | 180/41 X |
| 2,101,837 | 12/1937 | Blanchett | 180/41 X |
| 3,024,037 | 3/1962 | Fiala . | |
| 3,083,033 | 3/1963 | Fiala . | |
| 3,147,990 | 9/1964 | Wettstein . | |
| 3,539,197 | 11/1970 | Remaud | 280/6 R X |
| 3,589,700 | 6/1971 | Serpette | 280/6 H |
| 3,690,688 | 9/1972 | Fleury | 280/6 H |
| 3,842,926 | 10/1974 | Williams | 180/41 X |
| 3,884,496 | 5/1975 | Ito | 280/6 H X |
| 3,899,037 | 8/1975 | Yuker | 280/6 H X |
| 4,014,561 | 3/1977 | Tomiya et al. . | |

FOREIGN PATENT DOCUMENTS

| | | | |
|---|---|---|---|
| 481260 | 2/1952 | Canada | 248/188.3 |
| 1484738 | 2/1969 | Fed. Rep. of Germany | 280/6 R |

Primary Examiner—J. Franklin Foss
Attorney, Agent, or Firm—Senniger, Powers, Leavitt and Roedel

[57] ABSTRACT

A four-point suspension for a load comprising first, second, third and fourth supports for the load located at the corners of a quadrilateral and adapted to bear on a supporting surface for supporting the load above the surface at four points. Each support has an individual connection with the load for transmission of force from the load to the supporting surface and each connection permits relative up and down movement of the load and the respective support at the respective corner. Links at each side of the quadrilateral interconnect the supports at the two corners of each side for transmitting force between the supports, and act on upward movement of any support relative to the load (as may occur when the four points of the supporting surface engaged by the four supports are non-planar) to effect upward movement of the support at the opposite corner of the quadrilateral and downward movement of the other two supports relative to the load so that all four supports engage the supporting surface for stable support of the load.

6 Claims, 18 Drawing Figures

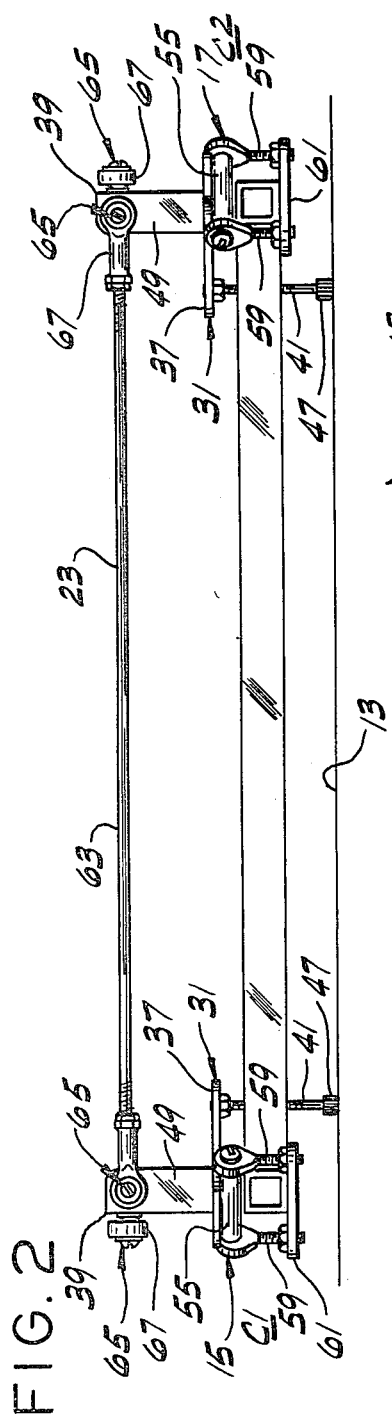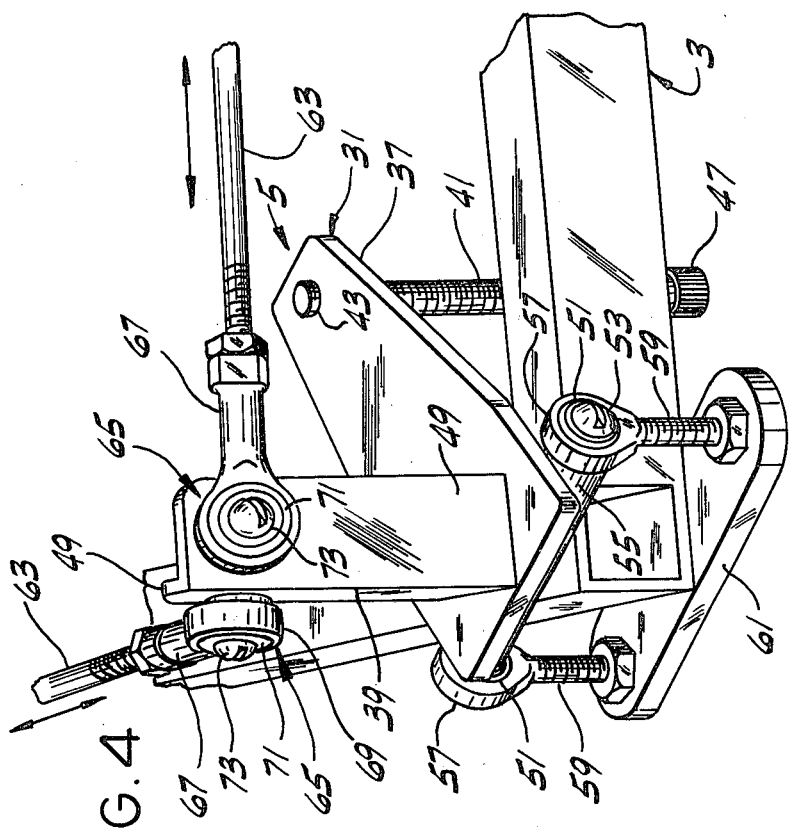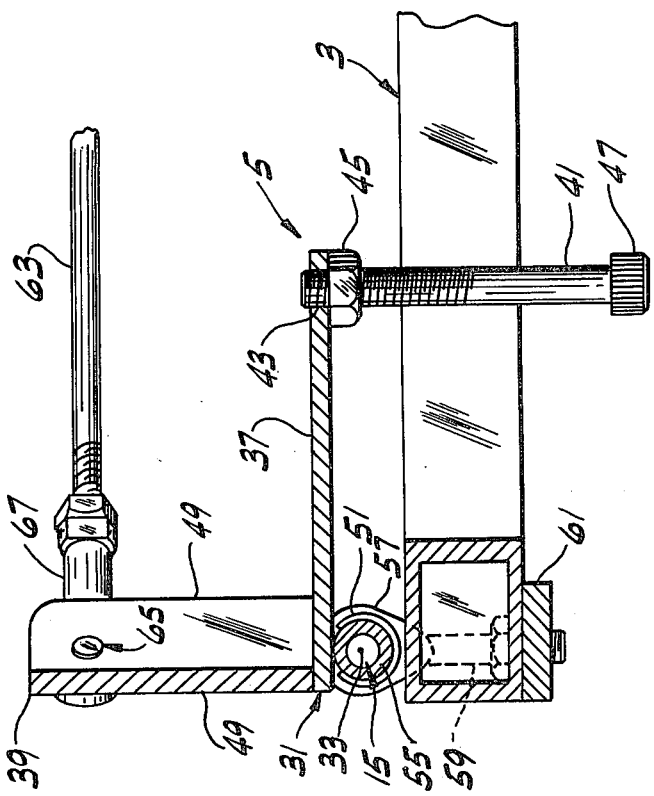

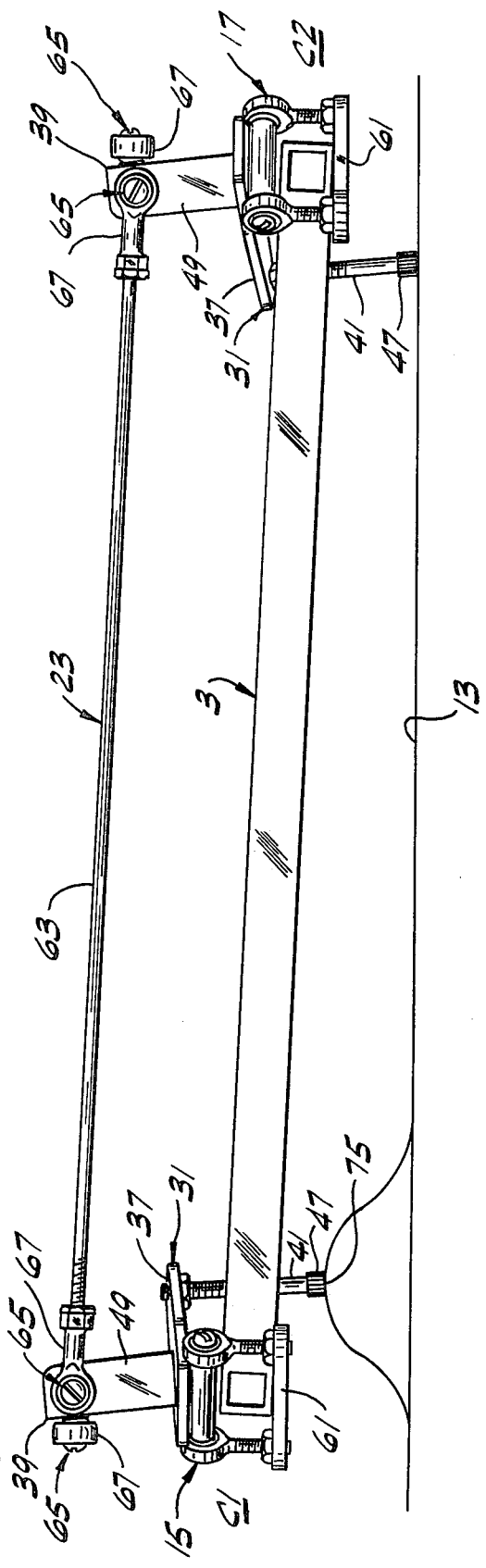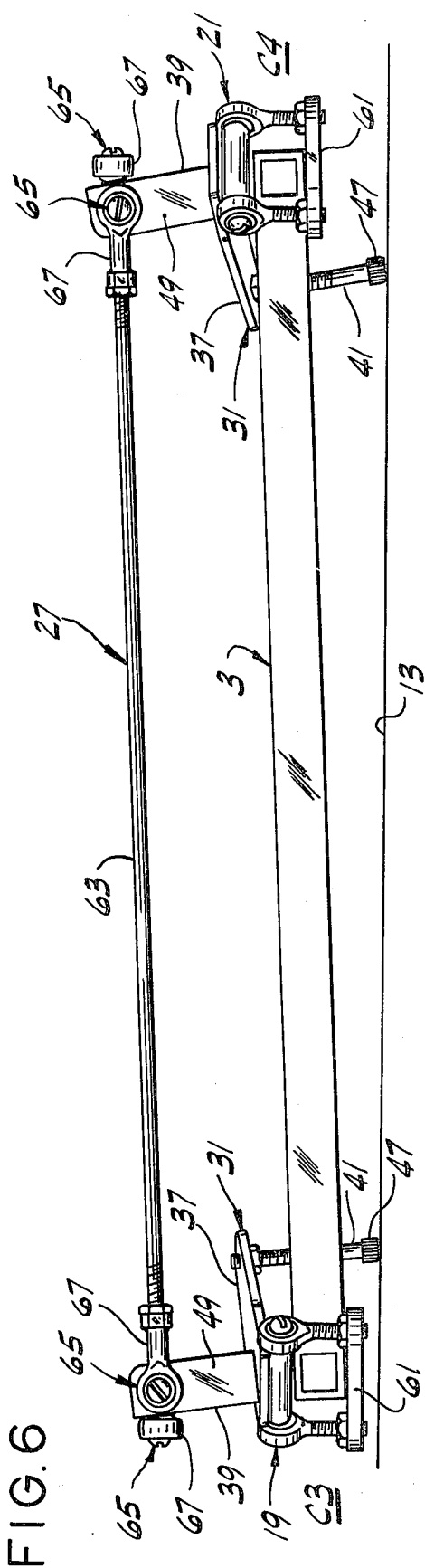

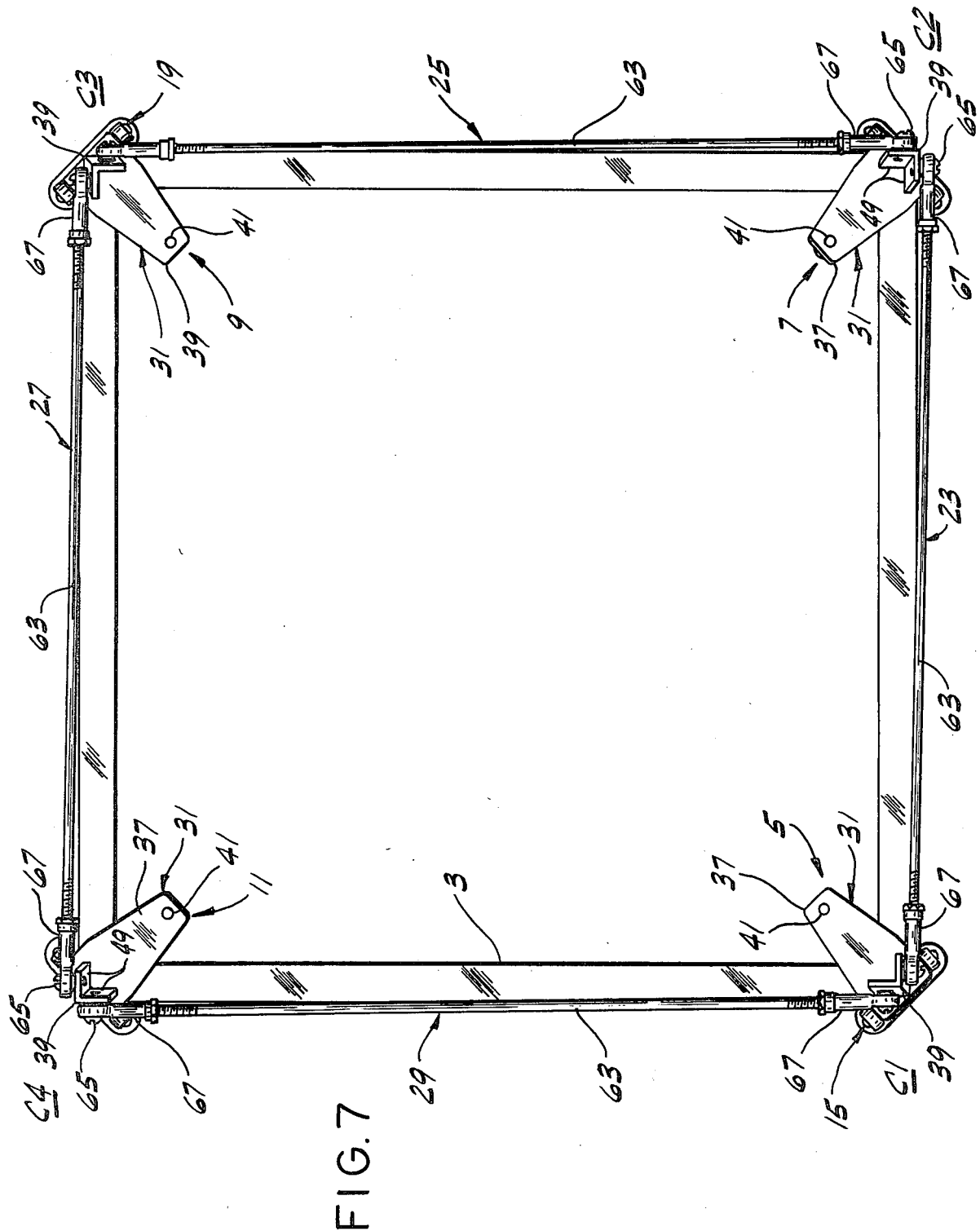

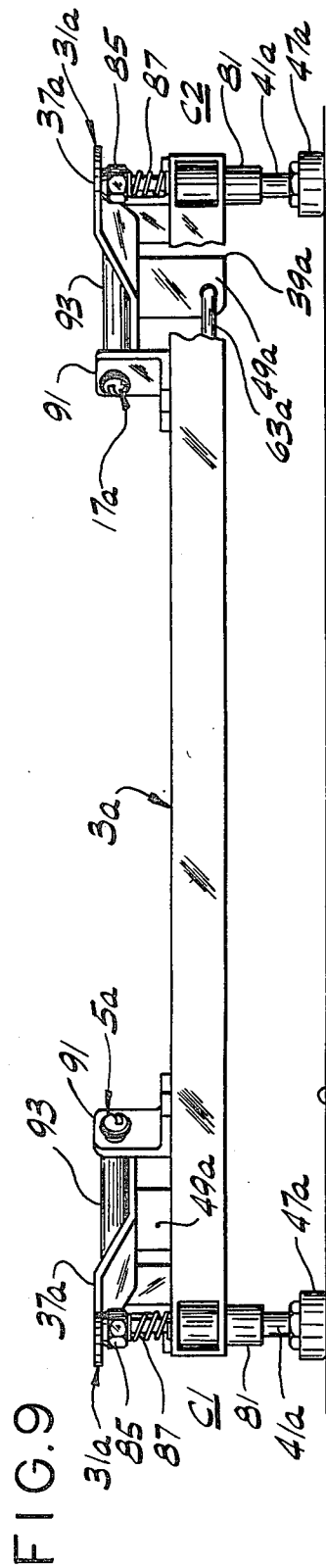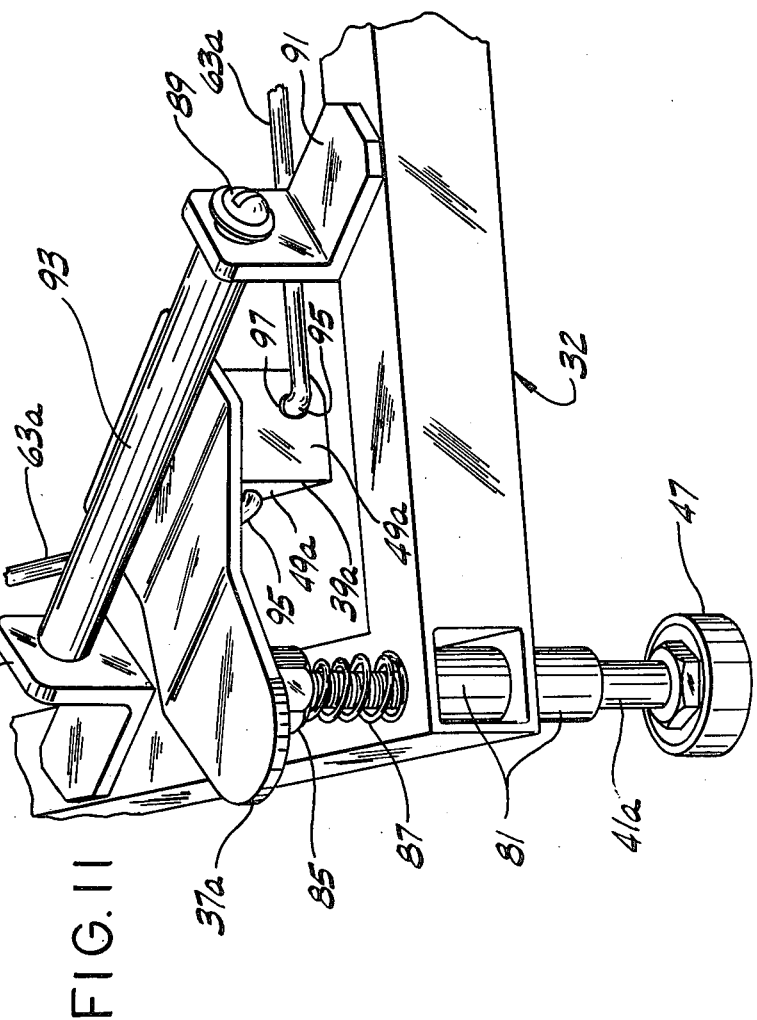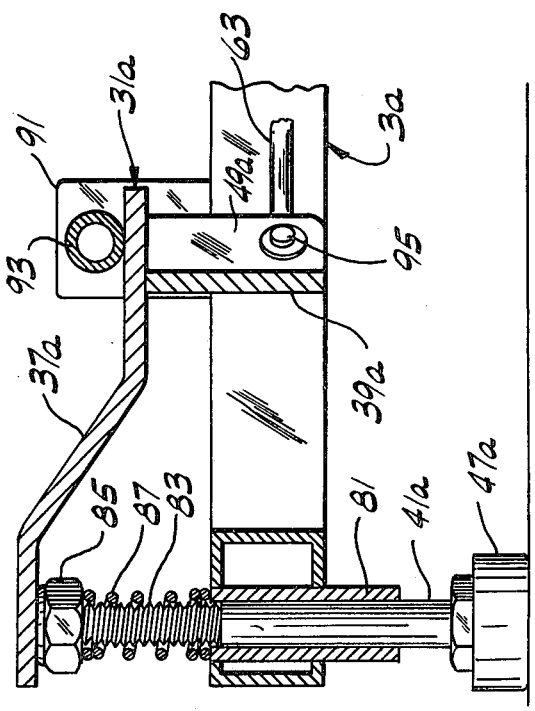

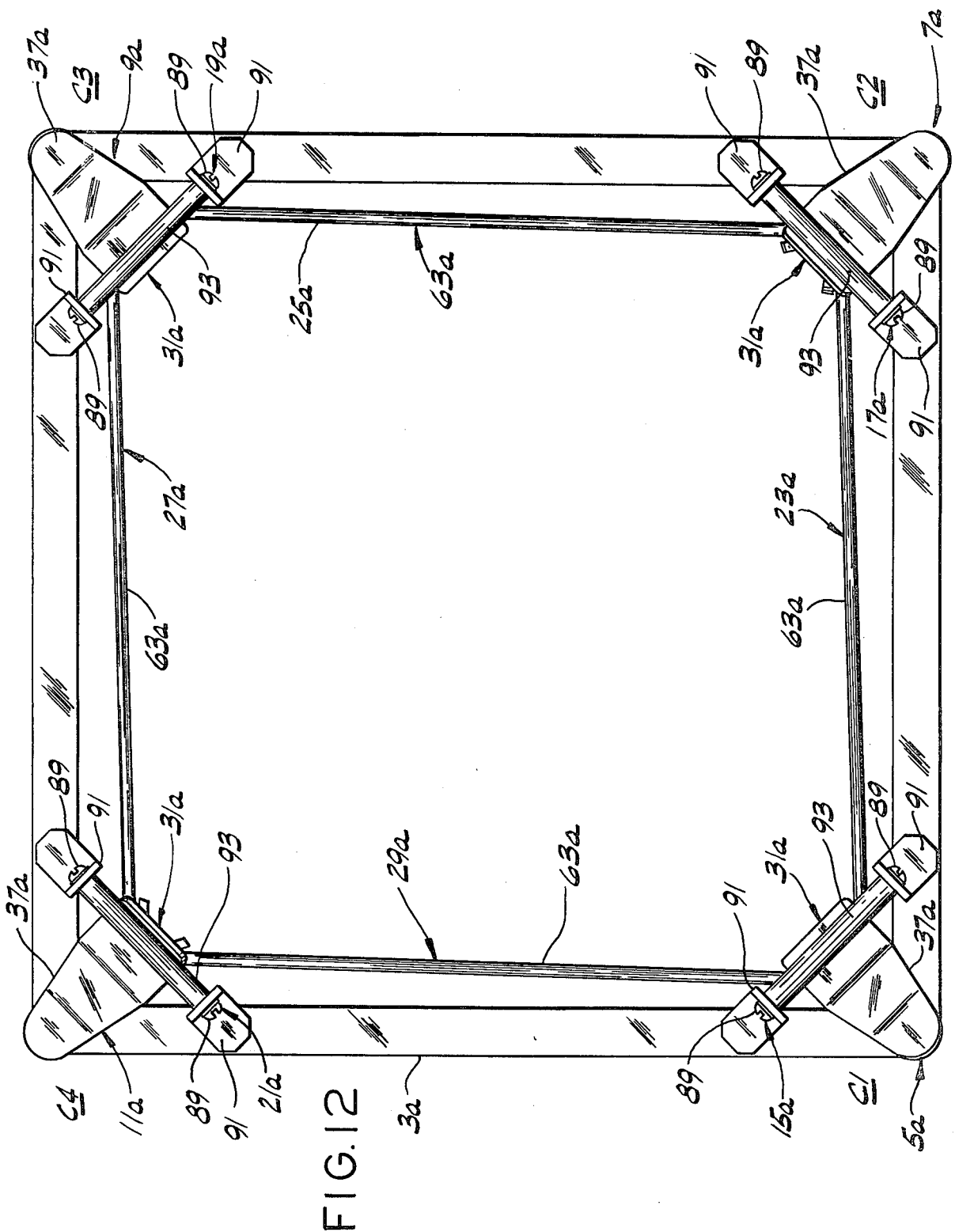

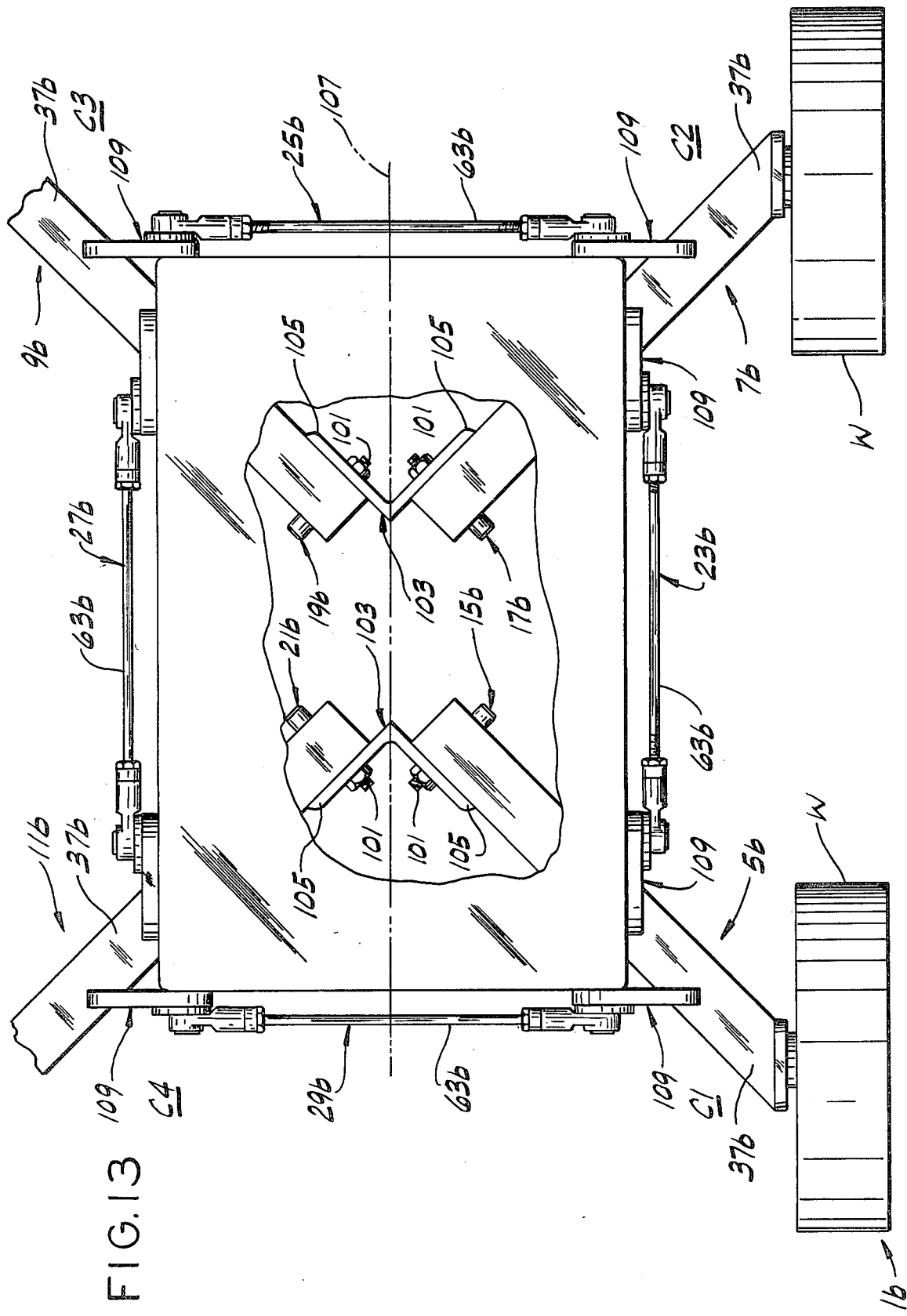

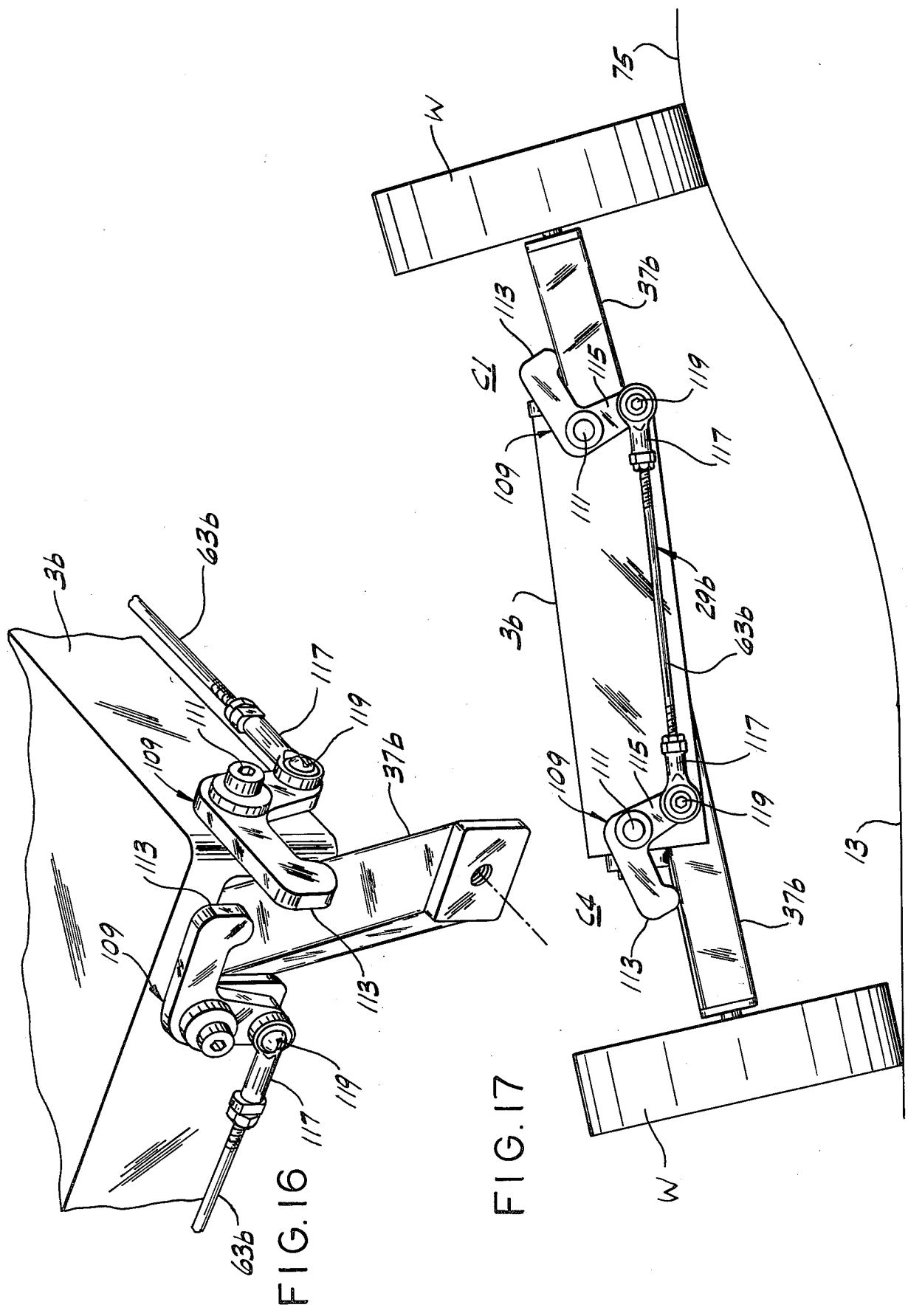

FOUR-POINT SUSPENSIONS

BACKGROUND OF THE INVENTION

This invention relates to load suspensions, and more particularly to four-point suspensions for supporting a load on a supporting surface.

The invention is particularly concerned with suspension systems for supporting loads at four points on a supporting surface. The load may be any one of a wide variety of loads such as are commonly supported (as by legs or on wheels or casters) at four points on a supporting surface such as a floor, or on the ground, or a roadbed. Thus, the suspension system of this invention is applicable to such loads as household appliances (e.g., washers, dryers, refrigerators), industrial equipment (e.g., machinery, cutting tables, etc.), office equipment, (e.g., copying machines), which bear at four points on the floor, and four-wheeled vehicles which bear at four points on various supporting surfaces. The problem with four-point suspensions is that if the supporting surface for the load is uneven, and one of the four points of the supporting surface where the suspension is to engage the supporting surface is not coplanar with the other three, the load will be unstable, having a tendency to rock about an axis extending generally through the highest point of the four and the diagonally opposite point, the load being supported only at three of the four points. This may be readily envisioned by considering the instability of a four-legged chair when a block is placed under one of the four legs. It will be observed that the chair is then unstable, tending to rock on an axis through the point of engagement of the blocked leg with the block and the point of engagement of the diagonally opposite leg with the floor.

SUMMARY OF THE INVENTION

Among the several objects of the invention may be noted the provision of a four-point suspension for a load for supporting the load at four points on a supporting surface, adapted automatically to compensate for unevenness of the supporting surface to support the load at all four points in generally stable condition; the provision of such a suspension involving four supports for support of the load at said four points, with automatic adjustment of the supports for said compensation; the provision of such a suspension adapted for use on loads which generally remain stationary (e.g., appliances, machinery, business equipment) or on mobile loads (e.g., four-wheeled vehicles); and the provision of such a suspension which is of a simple, low cost construction.

In general, a four-point suspension of this invention for a load comprises first, second, third and fourth support means for the load located at the corners of a quadrilateral and adapted to bear on a supporting surface at four points for supporting the load above said surface. Each support means has an individual connection with the load for transmission of force from the load to said supporting surface. Each of these connections permits relative up and down movement of the load and the respective support means at the respective corner. The first and third support means are located at opposite corners of the quadrilateral and the second and fourth support means are located at the other two opposite corners of the quadrilateral. The suspension further comprises first means interconnecting the first and second support means for transmitting force therebetween, second means interconnecting the second and third support means for transmitting force therebetween, third means interconnecting the third and fourth support means for transmitting force therebetween, and fourth means interconnecting the fourth and first support means for transmitting force therebetween. The interconnections act on upward movement of any support means relative to the load (as may occur when the four points of the supporting surface at the four support means are non-planar) to effect upward movement of the support means at the opposite corner of the quadrilateral and downward movement of the other two support means relative to the load so that all four support means engage the supporting surface and transmit force from the load to the supporting surface. The first, second, third, and fourth interconnecting means each comprises a link extending along a respective side of the quadrilateral, and acts on upward movement of any support means relative to the load to effect upward movement of the support means at the opposite corner of the quadrilateral and downward movement of the other two support means relative to the load for four-point support of the load. Each of said individual connections comprises a pivotal connection between the respective support means and the load. Each link interconnects the support means at the ends of the respective side of the quadrilateral. The said pivotal connection at each corner of the quadrilateral is on an axis extending along a line perpendicular to a vertical plane bisecting the angle formed by the two sides of the quadrilateral intersecting at the corner.

Other objects and features will be in part apparent and in part pointed out hereinafter.

BRIEF DESCRIPTION OF THE DRAWINGS

FIG. 2 is a side elevation of the first suspension on a level (planar) supporting surface;

FIG. 3 is an enlarged section on line 3—3 of FIG. 1;

FIG. 4 is an enlarged perspective of a corner of the first suspension;

FIG. 5 is a side elevation similar to FIG. 2 but showing the suspension with one of the four points of support (at the left of FIG. 5) higher than the plane of the other three points;

FIG. 6 is a view in elevation of the side of the suspension opposite the side shown in FIG. 5;

FIG. 7 is a plan similar to FIG. 1 showing the FIG. 1 suspension with the one point of support higher than the plane of the other three as in FIG. 5;

FIG. 9 is a side elevation of the second suspension on a level (planar) supporting surface;

FIG. 10 is an enlarged section on line 10—10 of FIG. 8;

FIG. 11 is an enlarged perspective of a corner of the second suspension;

FIG. 12 is a top plan similar to FIG. 8 showing the FIG. 8 suspension as it appears when one point of support is higher than the plane of the other three;

FIG. 13 is a plan of a third suspension as it appears when on a level (planar) supporting surface, parts being broken away;

FIG. 16 is an enlarged perspective of a corner of the third suspension, with parts broken away;

FIG. 17 is an end elevation similar to FIG. 14 but showing one point of support (at the right) higher than the others.

Corresponding reference characters indicate corresponding parts throughout the several views of the drawings.

DESCRIPTION OF THE PREFERRED EMBODIMENTS

Figure 1:
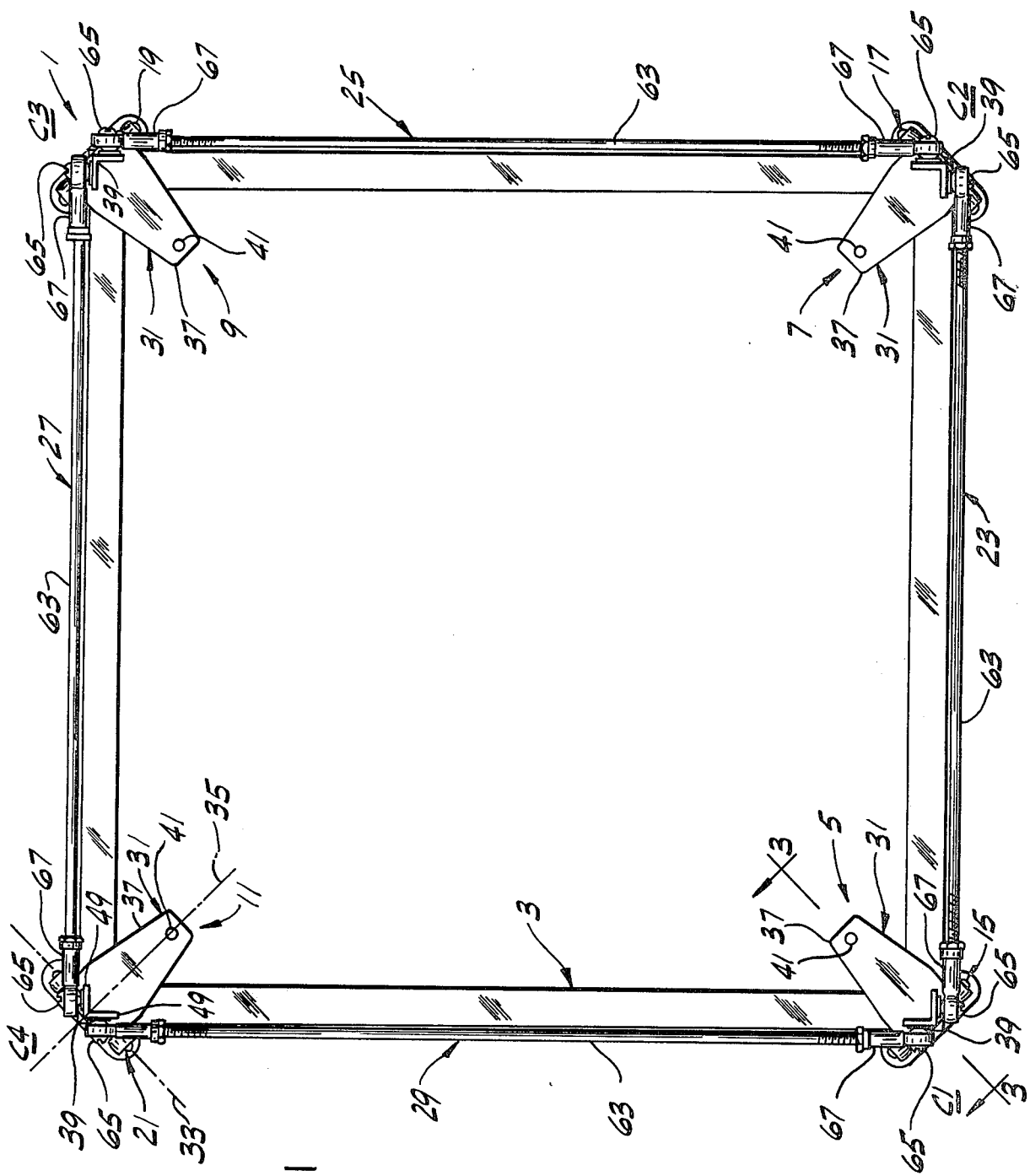
FIG. 1 is a plan of a first four-point suspension of this invention as it appears when on a supporting surface.
Figure 8:
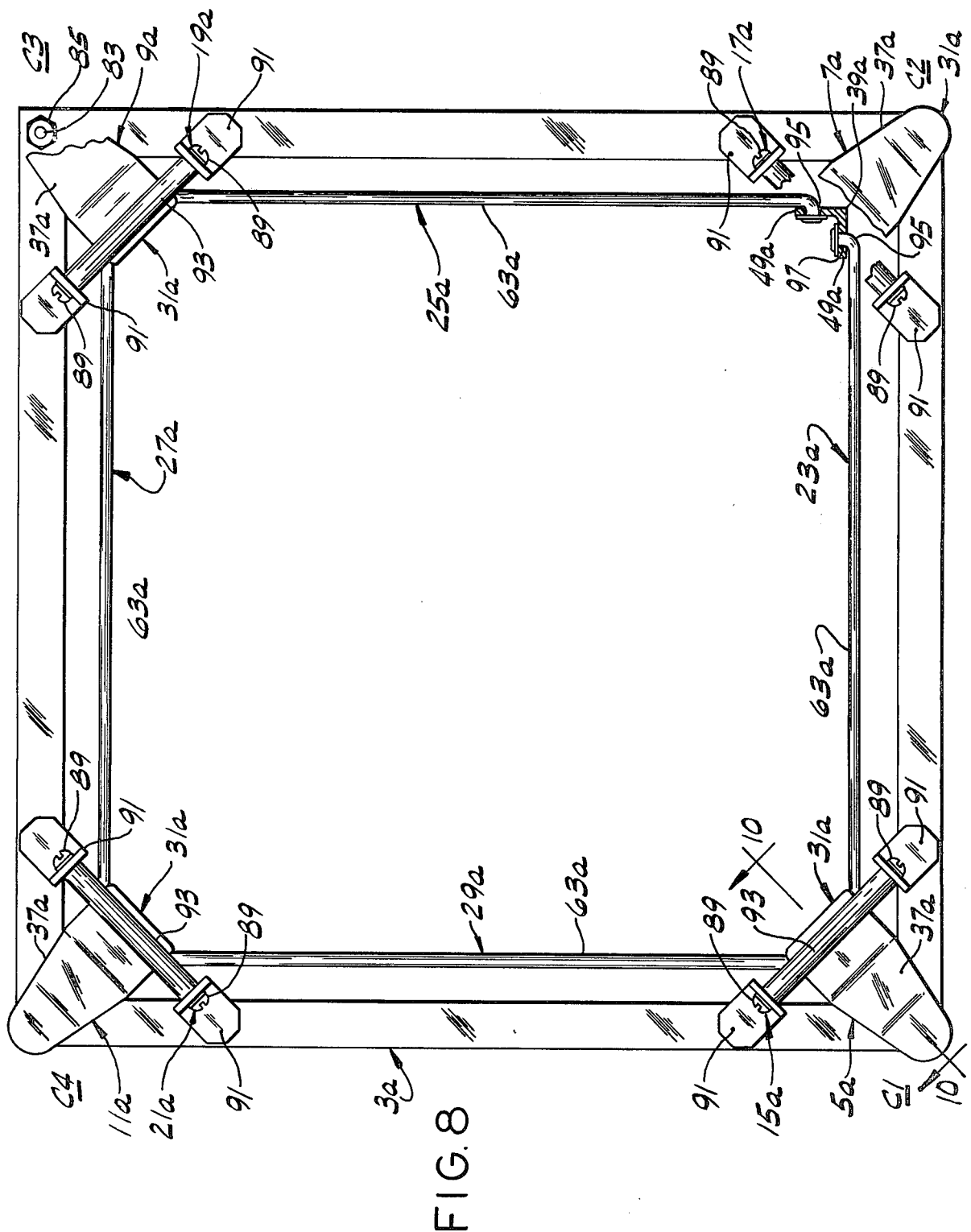
FIG. 8 is a plan of a second suspension of this invention as it appears when on a level (planar) supporting surface.
Figure 14:
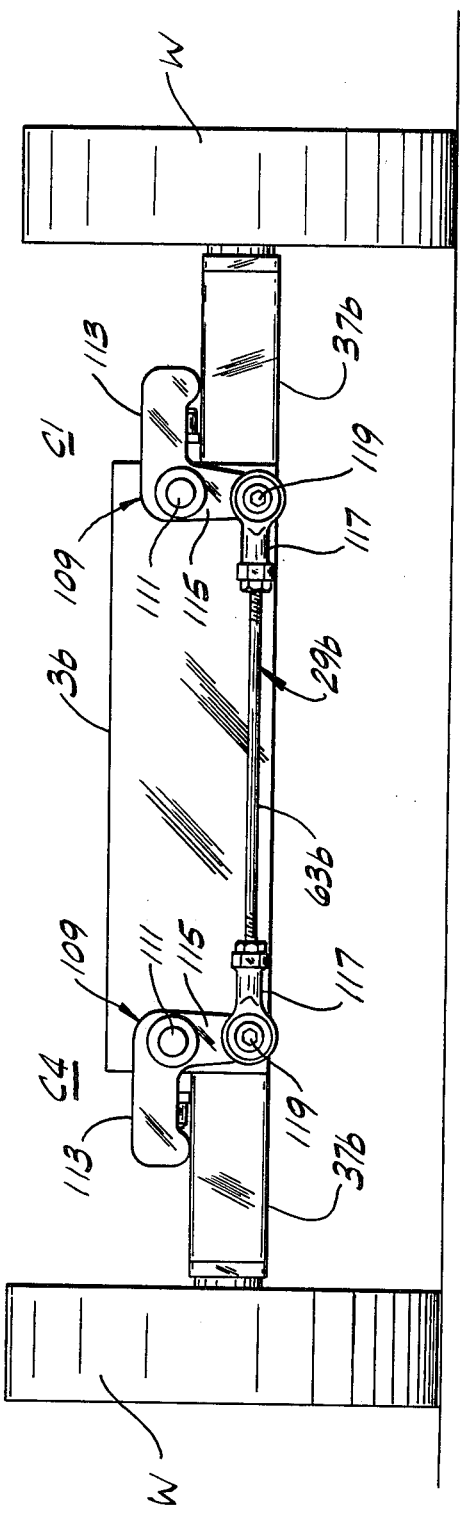
FIG. 14 is an end elevation of the third suspension on a level (planar) supporting surface.
Figure 15:
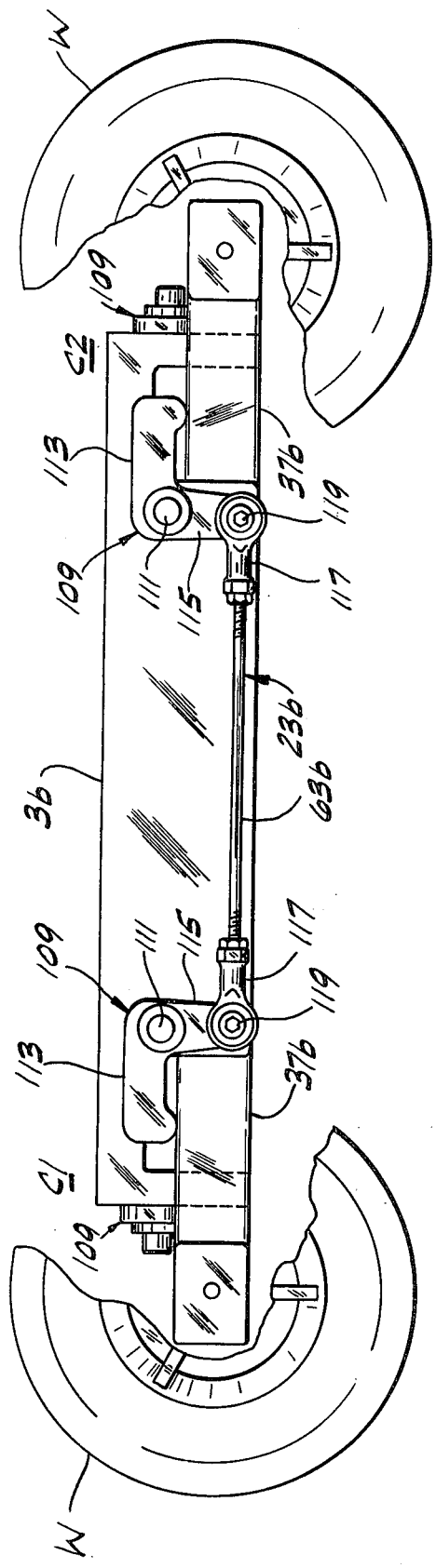
FIG. 15 is a side elevation with parts broken away of the third suspension on a level (planar) supporting surface.

Referring to the drawings, first more particularly to FIGS. 1-7, there is generally indicated at 1 a first suspension of this invention for a load 3 shown for purposes of illustration as an open rectangular (square) frame. The suspension 1 comprises first, second, third and fourth support means 5, 7, 9 and 11, respectively, for the load or frame 3 located at the four corners of the frame, and thus in general located at the four corners C1, C2, C3 and C4, respectively, of a quadrilateral (the rectangle defined by the frame). Each support means has an individual connection with the frame 3 for transmission of force from the load to a supporting surface indicated at 13, each of these connections being such, as will appear, as to permit relative up and down movement of the frame and the respective support means at the respective corner of the frame. These connections are designated 15, 17, 19 and 21, respectively, for the support means 5, 7, 9 and 11. The first and third support means 5 and 9 are located at two opposite corners of the quadrilateral frame 3 and the second and fourth support means 7 and 11 are located at the other two opposite corners of the quadrilateral frame.

A first means generally designated 23 interconnects the first and second support means 5 and 7 for transmitting force from the first to the second support means in one direction relative to the frame 3 and for transmitting force from the second support means 7 to the first support means 5 on movement of the second support means 7 in one direction relative to the frame.

A second means generally designated 25 interconnects the second and third support means 7 and 9 for transmitting force from the second to the third support means in one direction relative to the frame 3 and for transmitting force from the third support means 9 to the second support means 7 on movement of the third support means 9 in one direction relative to the frame.

A third means generally designated 27 interconnects the third and fourth support means 9 and 11 for transmitting force from the third to the fourth support means in one direction relative to the frame 3 and for transmitting force from the fourth support means 11 to the third support means 9 on movement of the fourth support means 11 in one direction relative to the frame.

A fourth means generally designated 29 interconnects the fourth and first support means 11 and 5 for transmitting force from the fourth to the first support means in one direction relative to the frame 3 and for transmitting force from the first support means 5 to the fourth support means 11 on movement of the first support means 5 in one direction relative to the frame.

The interconnections 23, 25, 27, 29 act on movement in either direction (up or down) of any support means 5, 7, 9, 11 relative to the frame 3 to effect movement in the same direction of the support means at the opposite corner of the frame 3 and movement in the opposite direction of the other two support means relative to the load. For example, on upward movement of support means 5, support means 9 moves upward and support means 7 and support means 9 move downward, all relative to the frame 3.

Each support means 5, 7, 9, 11 comprises a crank, and more particularly a bell crank generally designated 31. Each of the stated connections 15, 17, 19, 21 comprises a pivotal connection between the respective bell crank and the frame, mounting the bell crank for rocking movement relative to the frame 3 about an axis 33 extending over the respective corner of the frame perpendicular to the vertical plane 35 bisecting the angle formed by the two sides of the frame 3 intersecting at that corner. Each bell crank has a first arm 37 extending generally horizontally inward from its pivot over the corner of the frame and inwardly with respect to the frame, and a second arm 39 extending upwardly from its pivot. Each support means 5, 7, 9, 11 includes a support member constituted by a leg 41 secured to and extending down from the arm 37 of the respective bell crank 31 adapted to bear at its lower end on the supporting surface 13. The leg is shown as comprising a bolt adjustably threaded in a tapped hole 43 in the arm 37 adjacent the free end of the arm (its inner end with respect to the frame). A lock nut 45 on the bolt holds it in adjusted position. The bolt extends down from the arm 37 with its head 47 at its lower end.

The second arm 39 of each bell crank 31 is angle shaped in cross section, having two sides 49 at right angles to one another. It is centered in relation to the respective plane 35, the latter bisecting the right angle between the sides 49. Each of the pivotal connections 15, 17, 19, 21 between the bell cranks and the frame comprises a pair of ball joint members 51 secured by screws 53 at the ends of a bell crank hub member 55 secured to the bottom of the arm 37 of the bell crank 31 extending transversely across the bottom of the arm 37 at its pivot end, members 51 being journalled in ball joint eyes 57 at the upper ends of members 59 extending up from a bracket 61 secured to the bottom of the respective corner of the frame 3.

Each of the interconnecting means 23, 25, 27, 29 comprises a rod 63 adapted to act as a tension link extending between the upwardly extending arms 39 of the two bell cranks 31 of the two supporting means (5-7, 7-9, 9-11, 11-5) which it interconnects, the rod being pivotally connected at its ends to the said arms 39 as indicated at 65 adjacent their upper ends. Each of these pivotal connections 65 comprises a coupling 67 adjustably threaded on the respective end of the rod, the coupling having a ball joint eye end 69 on a ball joint member 71 secured by a screw 73 to the respective leg 49 of arm 39 of the respective bell crank 31. Thus, connections 65 are in effect universal joint connections between the ends of the rods or tension links 63 and the bell cranks 31 of the support means 5, 7, 9 and 11. The length of each tension link is adjustable by adjustment of the couplings 67 at the ends of the link.

The suspension system 1 as above described functions automatically to provide for four-point support of the frame or load 3, i.e., support at each of the four legs 41, not only when all four points of the supporting surface on which the frame and system 1 are positioned are coplanar, but also when the four points are not coplanar, i.e., when one of the four points is above or below the plane of the other three points. It automatically compensates for unevenness of the supporting surface to support the frame or load in generally stable condition so that the frame or load does not have any tendency to rock or tip on the supporting surface, and to provide for load distribution to the supporting surface through all four legs, not only through three of the legs. This automatic provision for four-point support at the four corners C1–C4 of the frame results from interaction of the four support means 5, 7, 9 and 11 and the four interconnecting means 23, 25, 27 and 29 to balance the moments of force tending to rock the bell cranks 31 of each support means. It will be understood that, as to each bell crank, there is a moment due to the reaction of the force being transmitted through the respective leg 41 tending to swing the arm 37 of the bell crank upwardly. This is resisted by an equal and opposite moment developed by forces applied to the arm 39 of the bell crank by the rods 63 of the two interconnecting means connected to arm 39.

Thus, when the frame 3 with the suspension system 1 is set on a planar horizontal supporting surface as illustrated in FIG. 2, on engagement of the lower ends of the legs 41 with the supporting surface each of the bell cranks 31 may rock relative to the frame to the position thereof shown in FIG. 1, and for the bell cranks of support means 5 and 7 in FIGS. 2 and 5 in FIG. 3, wherein the bell crank arms 37 are generally horizontal, and the bell crank arms 39 are generally vertical. The legs 41 extend generally vertically and the rods or links 63 extend generally horizontally at an elevation above the frame in vertical planes parallel to and just outside the sides of the frame. The moments on the bell cranks of all four of the support means are in balance, and the frame is in stable equilibrium.

Now, assuming that instead of being set on a planar horizontal supporting surface as in FIG. 2, the frame 3 with the suspension system 1 is set on a supporting surface which is uneven as illustrated with some exaggeration, for example, in FIG. 5 with the point 75 engaged by the lower end of the leg 41 of the support means 5 higher than the plane 77 of the other three points of engagement of the legs with the supporting surface. Under these circumstances, the leg 41 of the support means 5 moves upward relative to the frame 3, the arm 37 of the bell crank 31 of the support means 5 swings upward relative to the frame and its arm 39 swings outward, pulling the links 63 of the interconnecting means 23 and 29 in the direction toward the corner C1. Arms 39 of the bell cranks 31 at corners C2 and C4 swing in and legs 41 at these corners move down. On inward swing of arms 39 of the bell cranks at corners C2 and C4, links 63 of the interconnecting means 25 and 27 move away from corners C2 and C4 and allow arm 39 of the bell crank 31 at corner C3 to swing outward, thus allowing the leg 41 at corner C3 to move upward relative to the frame.

The above-described automatic compensation of the suspension system 1 for the high point 75 is such that the legs 41 at corners C1 and C3 are raised relative to the frame, the legs 41 at corners C2 and C4 are correspondingly lowered relative to the frame, and all four of the legs engage the supporting surface for the four-point support of the frame, as shown in FIGS. 5 and 6. The frame is inclined down from C1 to C2 and up from C3 to C4. Referring to FIG. 7, it will be observed that the bell crank arms 39 at corners C1 and C3 are inclined inwardly and the bell crank arms 39 at corners C2 and C4 are inclined outwardly, and that the rods 63 are slightly angled relative to the sides of the frame, permitted by the universal joint connections at 65.

It is to be noted that the interconnections 23, 25, 27 and 29 act on upward movement of the leg 41 of any one of the support means 5, 7, 9, 11 relative to the frame to effect a corresponding relative upward movement of the support means at the diagonally opposite corner of the frame, and corresponding downward movement of the other two support means relative to the frame for four-point suspension of the load. Thus, as above described, if the leg at C1 moves up, the leg at C3 moves up and the legs at C2 and C4 move down. If the leg at C2 moves up, the leg at C4 moves up and the legs at C1 and C3 move down. If the leg at C3 moves up, the leg at C1 moves up, and the legs at C2 and C4 move down, and if the leg at C4 moves up, the leg at C2 moves up and the legs at C1 and C3 move down.

A second suspension 1a of this invention for a load illustrated as a frame 3a is shown in FIGS. 8–12. This second embodiment of the suspension is generally similar to the first, differing principally in that the legs are vertically slidable at the corners of the frame, the bell cranks have arms extending down instead of up, and the interconnecting means is within the frame rather than on the outside relative to the frame. The first, second, third and fourth support means of the second embodiment are designated 5a, 7a, 9a, 11a, the individual connections between the support means and the frame are designated 15a, 17a, 19a and 21a, and the four interconnecting means are designated 23a, 25a, 27a and 29a.

Each support means 5a, 7a, 9a and 11a comprises a bell crank generally designated 31a, and each of the stated connections 15a, 17a, 19a and 21a comprises a pivotal connection between the respective bell crank and the frame 3a, mounting the bell crank for rocking movement relative to the frame about an axis 33a angled like axis 33. Each bell crank 31a has a first arm 37a extending outward from its pivot over the corner of the frame (outwardly with respect to the frame) and a second arm 39a extending downwardly from its pivot. Each support means 5a, 7a, 9a, 11a includes a leg 41a slidable vertically on a tubular guide 81 in the respective corner of the frame having an enlarged foot 47a at its lower end for engagement with the supporting surface. The leg has an upper threaded portion 83 on which is threaded a nut 85 engageable by the bottom of the arm 37a of the respective bell crank, the leg being biased upwardly for engagement of the nut with arm 37a by a spring 87.

The second arm 39a of each bell crank 31a is of angle shape in cross section, having two sides 49a at right angles to one another, similar to arms 39 with their sides 49. Each of the pivotal connections 15a, 17a, 19a and 21a comprises a pair of pivot pins 89 carried by brackets 91 on the frame 3a, the pins extending into a tubular hub member 93 for the bell crank secured to the top of and extending transversely across the arm 37a of the bell crank at its pivot end. The arms 39a of the bell cranks extend down within the frame adjacent the corners C1–C4 of the frame, and the four interconnecting means 23a, 25a, 27a and 29a (corresponding to 23, 25, 27 and 29) and constituted by rods 63a with bent ends 95 received in holes 97 in the sides are provided interconnecting the arms 39a of the bell cranks 31a. The rods are adapted to act in compression as well as tension, and their bent ends 95 are loose enough in the holes 97 to permit some degree of universal pivoting.

The suspension system 1a of FIGS. 8-12 functions automatically to provide for four-point support of the frame or load 3, i.e., support at each of the four legs 41a, in a manner similar to that of the first embodiment shown in FIGS. 1-7. Thus, when the frame 3a with the suspension system 1a is set on a planar horizontal supporting surface as in FIG. 9, on engagement of the lower ends of the legs 41a with the supporting surface, each of the bell cranks 31a may rock relative to the frame 3a to the position wherein the arms 37a of the bell cranks extend as shown in FIGS. 9 and 10 and the arms 39a extend generally vertically downwardly. The four legs 41a all extend generally equally down from the frame and the four rods 63a extend generally horizontally on the inside of the four sides of the frame 3a parallel to the sides of the frame (see FIG. 8). The moments on the bell cranks 31a at all four corners C1-C4 are in balance, and the frame 3a is in stable equilibrium.

If the leg 41a at corner C1 comes down on a point higher than the plane of the lower ends of the other three legs, for example, the leg 41a at corner C1 moves up relative to the frame, the arm 37a of the bell crank 31a at corner C1 swings up and its arm 39a swings out. This pulls the rods 63a of the interconnecting means 23a and 29a toward corner C1. Arms 37a of the bell cranks 31a at corners C2 and C4 swing down and move the legs 41a at these corners down. As arms 37a at corners C2 and C4 swing down, arms 39a at these corners swing in. This allows rods 63a of the interconnecting means 25a and 27a to move toward corner C3, allowing arm 39a at C3 to swing out and arm 37a at C3 to swing up, thereby allowing leg 41a at C3 to move up relative to the frame (like the leg at corner C1). Thus, suspension 1a functions generally in the same manner as suspension 1 to effect automatic compensation for a point of suspension being out of the plane of the other three points of suspension.

A third suspension 1b for a load illustrated as a rectangular frame or chassis 3b of a four-wheeled vehicle is shown in FIGS. 13-18. This third embodiment is similar to the first two in comprising first, second, third and fourth support means designated 5b, 7b, 9b and 11b, individual connections indicated at 15b, 17b, 19b and 21b between the support means and the frame 3b, and four interconnecting means designated 23b, 25b, 27b and 29b.

Each support means 5b, 7b, 9b and 11b comprises an arm 37b pivoted at a respective connection 15b, 17b, 19b, 21b on the bottom of the frame or chassis 3b, extending diagonally with respect to the frame outwardly from its pivot beyond a respective corner C1, C2, C3, C4 of the frame and having a wheel W at its outer end outward of the frame. Each of the pivotal connections for the two arms 37b at one end of the vehicle (e.g., its left end as viewed in FIG. 13) comprises a pin 101 extending through the arm adjacent the inner end of the arm and through a bearing 103 for the pin extending down from the bottom of the frame or chassis, and each of the pivotal connections for the other two arms comprises a similar pin extending through a similar bearing. As shown in FIG. 13, the bearings are of angle shape in cross section, having sides 105 extending at 45° in opposite directions from the vertical central longitudinal plane 107 of the vehicle, the pins extending through these sides and thus mounting each arm for swinging movement about a horizontal axis extending at an angle of 45° to said plane. The arms at one end diverge outwardly in the direction toward that end, and the arms at the other end diverge outwardly in the opposite direction. The wheel axes are at 45° to the arms, and the wheels are in planes parallel to the plane 107.

Each of the interconnecting means 23b, 25b, 27b, 29b comprises a pair of bell cranks, one at each of the two corners of the frame or chassis between which the particular connecting means extends, and a link constituted by a rod 63b interconnecting the two bell cranks. Each bell crank, designated in its entirety by the reference numeral 109, is pivoted at 111 on the outside of the frame or chassis 3b adjacent its respective corner for swinging movement on a horizontal axis at right angles to the respective side of the frame, and has a first arm 113 extending from the pivot over the respective wheel support arm 37b, and a second arm 115 extending down from the pivot. Arms 115 of the two bell cranks 109 of each interconnecting means 23b, 25b, 27b, 29b are interconnected by a rod 63a, the latter having couplings 117 adjustably threaded on its ends for length adjustment of the interconnection, the couplings being pin-connected to arms 115 at 119. Arms 113 of the bell cranks 109 are interengageable at their outer ends with the top of a respective wheel support arm 37b.

The suspension system 1b functions automatically to provide for four-point support of the frame or load 3b, i.e., support at each of the four wheels W, in a manner similar to that of the other embodiments. Thus, when the vehicle is on a planar horizontal supporting surface as in FIGS. 14 and 15, each of the arms 37b extends generally horizontally from its pivot at 101. Force is transmitted upwardly from each arm 37b to the arms 113 of the two bell cranks 109 at the respective corner of the frame 3b, tending to rock each bell crank in the direction to swing its arm 113 upward and its arm 115 outward. Rods 63a are in tension, holding the frame in stable equilibrium.

Figure 18:
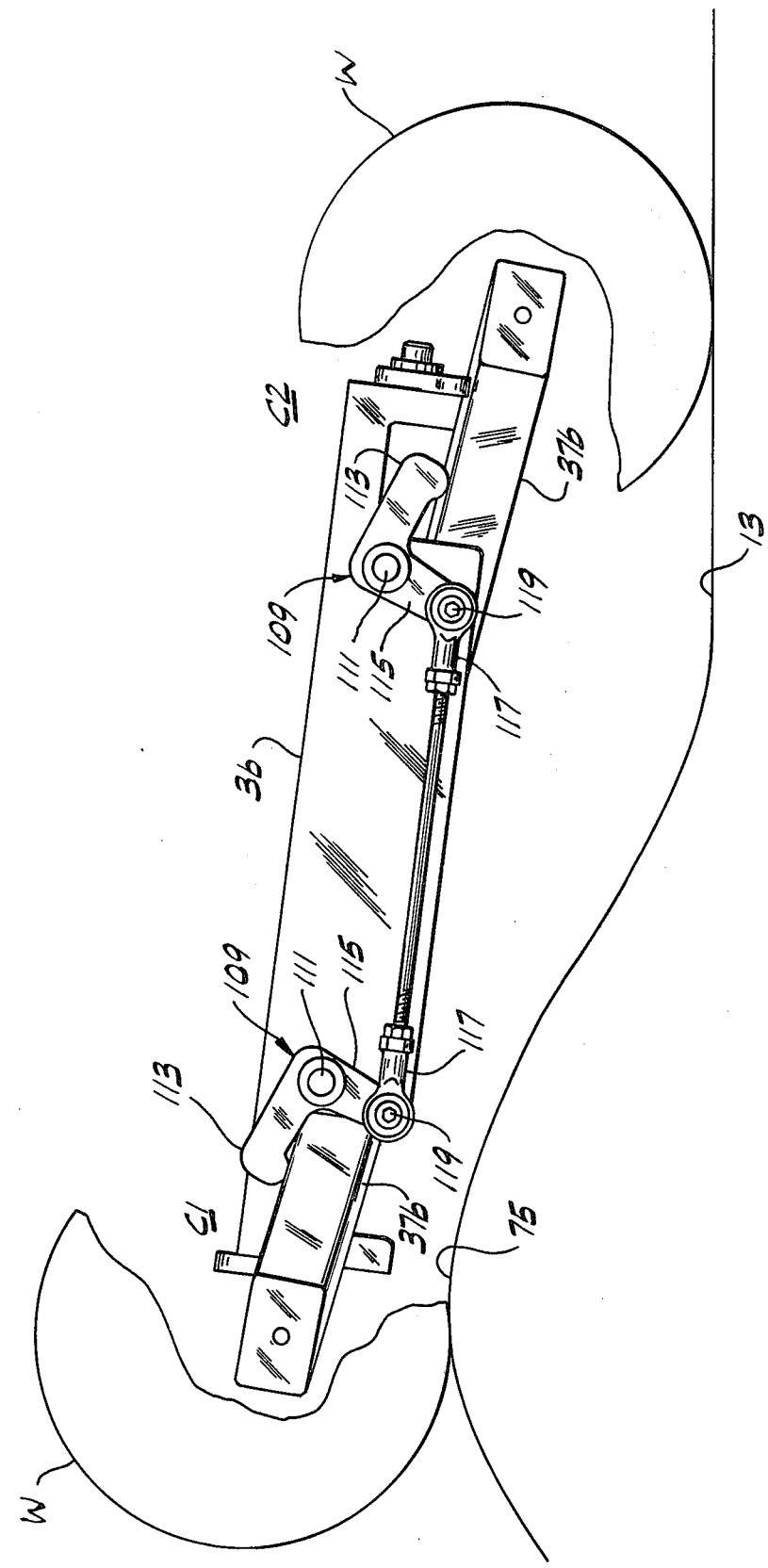
FIG. 18 is a side elevation similar to FIG. 15 showing the one point of support (here at the left) higher than the others.

If the wheel W at corner C1 engages a point 75 higher than the plane of the bottoms of the other three wheels, for example, as illustrated in FIGS. 17 and 18, the arm 37b at corner C1 swings up relative to the frame. This swings the two bell cranks 109 at corner C1 in the direction to swing their arms 113 upward and their arms 115 outward. This pulls the rods 63b of the interconnecting means 23b and 29b toward corner C1. Arms 113 of the bell cranks 109 at corners C2 and C4 thereupon swing down and move arms 37b at corners C2 and C4 down to move the wheels at these corners down. At the same time, arms 115 of the bell cranks at corners C2 and C4 swing in, and this allows rods 63b of the interconnecting means 25b and 27b to move toward corner C3, allowing the bell crank 109 at corner C3 to swing in the direction to swing its arm 113 up, and thereby allowing the wheel at corner C3 to move up relative to the frame (like the wheel at corner C1). Thus, the suspension 1b functions to effect automatic compensation for a point of suspension (at one wheel) being out of the plane of the other three points of suspension (at the other three wheels).

In view of the above, it will be seen that the several objects of the invention are achieved and other advantageous results attained.

As various changes could be made in the above constructions without departing from the scope of the invention, it is intended that all matter contained in the above description shown in the accompanying drawings shall be interpreted as illustrative and not in a limiting sense.

What is claimed is:

1. A four-point suspension for a load comprising:

first, second, third and fourth support means for the load, said support means being located at the corners of a quadrilateral, said support means being adapted to bear on a supporting surface at four points for supporting the load above said surface;

each support means having an individual connection with the load for transmission of force from the load to said supporting surface, each connection permitting relative up and down movement of the load and the respective support means at the respective corner, the first and third support means being located at two opposite corners of the quadrilateral and the second and fourth support means being located at the other two opposite corners of the quadrilateral, first means interconnecting the first and second support means for transmitting force from the first to the second support means on movement of the first support means in one direction relative to the load and for transmitting force from the second support means to the first support means on movement of the second support means in one direction relative to the load, second means interconnecting the second and third support means for transmitting force from the second to the third support means on movement of the second support means in one direction relative to the load and for transmitting force from the third support means to the second support means on movement of the third support means in one direction relative to the load, third means interconnecting the third and fourth support means for transmitting force from the third to the fourth support means on movement of the third support means in one direction relative to the load and for transmitting force from the fourth support means to the third support means on movement of the fourth support means in one direction relative to the load, and fourth means interconnecting the fourth and first support means for transmitting force from the fourth to the first support means on movement of the fourth support means in one direction relative to the load and for transmitting force from the first support means to the fourth support means on movement of the first support means in one direction relative to the load, said first, second, third, and fourth interconnecting means each comprising a link extending along a respective side of the quadrilateral, and acting on upward movement of any support means relative to the load to effect upward movement of the support means at the opposite corner of the quadrilateral and downward movement of the other two support means relative to the load for four-point support of the load, each of said individual connections comprising a pivotal connection between the respective support means and the load, each link interconnecting the support means at the ends of the respective side of the quadrilateral, the said pivotal connection at each corner of the quadrilateral being on an axis extending along a line perpendicular to a vertical plane bisecting the angle formed by the two sides of the quadrilateral intersecting at the corner.

2. A four-point suspension for a load comprising:

first, second, third and fourth support means for the load, said support means being located at the corners of a quadrilateral, said support means being adapted to bear on a supporting surface at four points for supporting the load above said surface;

each support means having an individual connection with the load for transmission of force from the load to said supporting surface, each connection permitting relative up and down movement of the load and the respective support means at the respective corner, the first and third support means being located at two opposite corners of the quadrilateral and the second and fourth support means being located at the other two opposite corners of the quadrilateral, first means interconnecting the first and second support means for transmitting force from the first to the second support means on movement of the first support means in one direction relative to the load and for transmitting force from the second support means to the first support means on movement of the second support means in one direction relative to the load, second means interconnecting the second and third support means for transmitting force from the second to the third support means on movement of the second support means in one direction relative to the load and for transmitting force from the third support means to the second support means on movement of the third support means in one direction relative to the load, third means interconnecting the third and fourth support means for transmitting force from the third to the fourth support means on movement of the third support means in one direction relative to the load and for transmitting force from the fourth support means to the third support means on movement of the fourth support means in one direction relative to the load, and fourth means interconnecting the fourth and first support means for transmitting force from the fourth to the first support means on movement of the fourth support means in one direction relative to the load and for transmitting force from the first support means to the fourth support means on movement of the first support means in one direction relative to the load, said first, second, third, and fourth interconnecting means each comprising a link extending along a respective side of the quadrilateral, and acting on upward movement of any support means relative to the load to effect upward movement of the support means at the opposite corner of the quadrilateral and downward movement of the other two support means relative to the load for four-point support of the load, the support means at each corner of the quadrilateral comprising a support member engageable with the supporting surface and a crank pivoted on the load, each said link extending along a respective side of the quadrilateral interconnecting the cranks at the ends of that side, each crank being a bell crank having a first arm with the respective support member extending down from said first arm and a second arm, each link interconnecting the second arms of the bell cranks at the ends of the side of the quadrilateral along which the link extends.

3. A four-point suspension as set forth in claim 2 wherein each support member comprises a leg secured to and extending down from the first arm of the respective bell crank.

4. A four-point suspension system as set forth in claim 3 wherein the said pivotal connection at each corner of the quadrilateral is on an axis extending along a line perpendicular to a vertical plane bisecting the angle formed by the two sides of the quadrilateral intersecting at the corner, the second arms of the bell cranks extending upwardly and the links being connected to the second arms adjacent their upper ends.

5. A four-point suspension as set forth in claim 2 wherein each support member comprises a leg slidable up and down at the respective corner of the quadrilateral, the first arms of each bell crank extending over and engaging the upper end of the respective leg.

6. A four-point suspension as set forth in claim 5 wherein the said pivotal connection at each corner of the quadrilateral is on an axis extending along a line perpendicular to a vertical plane bisecting the angle formed by the two sides of the quadrilateral intersecting at the corner, the second arms of the bell cranks extending down within the frame, the links being connected to the second arms adjacent their lower ends.

* * * * *